(12) United States Patent
Symington

(10) Patent No.: US 6,634,385 B2
(45) Date of Patent: Oct. 21, 2003

(54) APPARATUS FOR CONVEYING FLUIDS AND BASE PLATE

(75) Inventor: Ian Symington, Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 73 days.

(21) Appl. No.: 10/027,545

(22) Filed: Dec. 21, 2001

(65) Prior Publication Data

US 2003/0116207 A1 Jun. 26, 2003

(51) Int. Cl.$^7$ ................................................ F16K 11/10
(52) U.S. Cl. ...................................... 137/884; 137/15.11
(58) Field of Search ................................. 137/269, 270, 137/271, 884, 15.11; 285/13, 93

(56) References Cited

U.S. PATENT DOCUMENTS

| | | | |
|---|---|---|---|
| 3,871,209 A | | 3/1975 | Hasha |
| 3,895,831 A | * | 7/1975 | Fisher .......................... 285/93 |
| 3,945,431 A | * | 3/1976 | Straub ......................... 165/158 |
| 4,817,994 A | * | 4/1989 | Bronnert ...................... 285/93 |
| 5,255,559 A | | 10/1993 | Jansch |
| 5,988,217 A | * | 11/1999 | Ohmi et al. ............... 137/614.2 |
| 6,026,843 A | | 2/2000 | Pozniak et al. |
| 6,068,016 A | * | 5/2000 | Manofsky, Jr. et al. ..... 137/269 |
| 6,293,310 B1 | * | 9/2001 | Redemann et al. ......... 137/884 |
| 6,415,822 B1 | * | 7/2002 | Hollingshead .............. 137/884 |

FOREIGN PATENT DOCUMENTS

JP         2000028470         1/2000

* cited by examiner

Primary Examiner—John Fox
(74) Attorney, Agent, or Firm—Patricia S. Goddard

(57) ABSTRACT

The invention relates to an apparatus for conveying at least one fluid, comprising at least a first fluidic element (10) and a second fluidic element (30) connected to each other for conveying said fluid, and a base plate (24) to which said first fluidic element (10) and said second fluidic element (30) are mounted. In accordance with the invention said base plate (24) comprises at least a first outlet (46) for feeding a leak test agent to the connection area of said first fluidic element (10) and said second fluidic element (30).

The invention further relates to a base plate (24) for mounting at least a first fluidic element (10) and a second fluidic element (30) connectable to each other for conveying a fluid. In accordance with the invention said base plate (24) comprises at least a first outlet (46) for feeding a leak test agent to an connection area of said first fluidic element (10) and said second fluidic element (30).

17 Claims, 2 Drawing Sheets

APPARATUS FOR CONVEYING FLUIDS AND BASE PLATE

FIELD OF THE INVENTION

The present invention generally relates to an apparatus for conveying at least one fluid, and more particularly to an apparatus for conveying at least one fluid, comprising at least a first fluidic element and a second fluidic element connected to each other for conveying said fluid, and a base plate to which said first fluidic element and said second fluidic element are mounted. The present invention further relates to a base plate, and more particularly to a base plate for mounting at least a first fluidic element and a second fluidic element connectable to each other for conveying a fluid.

BACKGROUND OF THE INVENTION

For example in the field of the fabrication of semiconductor devices there are used gas panels comprising a plurality of fluidic elements for distributing gases that are for example necessary for chemical vapor deposition processes, etching processes, or diffusion processes. With such gas panels the fluidic elements may for example be manual valves, regulators, filters, transducers, air operated valves, purge blocks, mass flow controllers, and base blocks. Said base blocks are generally used for connecting other fluidic elements. For example the replacing of a faulty fluidic element requires as a safety precaution that the gas panel is checked for leaks. In this context it is well-known to bring helium as a leak test agent in the proximity of a potential leak of an evacuated system. The amount of helium getting into the evacuated system is a measure for the leak rate. For example if integrated gas panels are used, due to the relative close proximity of all components, there may arise the problem that it is difficult to bring helium close to a potential leak and especially to identify a problem component that is leaking.

The present invention seeks to solve this problem by improving the above mentioned apparatus and the above mentioned base plate.

DETAILED DESCRIPTION OF PREFERRED EMBODIMENTS

According to the present invention there is provided an apparatus for conveying at least one fluid, comprising at least a first fluidic element 10 and a second fluidic element 30 connected to each other for conveying said fluid, and a base plate 24 to which said first fluidic element 10 and said second fluidic element 30 are mounted, wherein said base plate 24 comprises at least a first outlet 46 for feeding a leak test agent to the connection area of said first fluidic element 10 and said second fluidic element 30.

Furthermore, according to the present invention there is provided a base plate 24 for mounting at least a first fluidic element 10 and a second fluidic element 30 connectable to each other for conveying a fluid, wherein said base plate 24 comprises at least a first outlet 46 for feeding a leak test agent to an connection area of said first fluidic element 10 and said second fluidic element 30.

In the context of the present invention the term "fluid" stands for any liquid and/or gas. The term "fluidic element" stands for any element suitable for transporting and/or affecting any fluid. With preferred embodiments of the present invention the leak test agent is helium.

Although the invention will be described with reference to a gas panel it is not limited to this application but may for example also be used in the field of quartz-ware.

Figure 1:
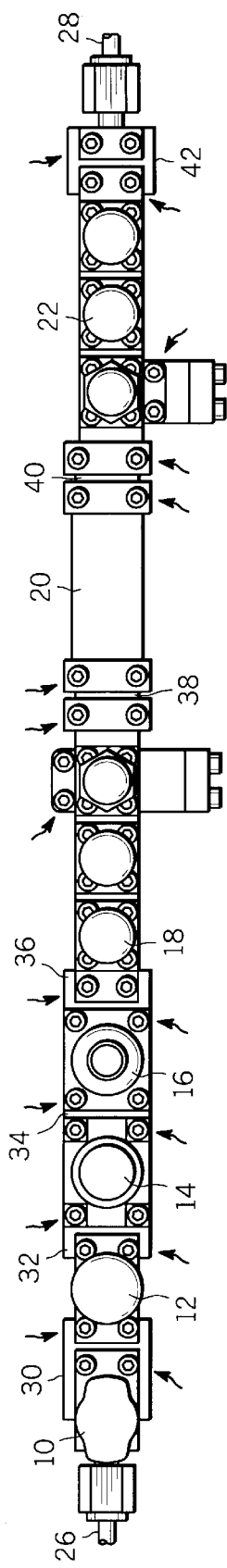
FIG. 1 shows a top view of a gas stick formed by a plurality of fluidic elements.
Figure 2:
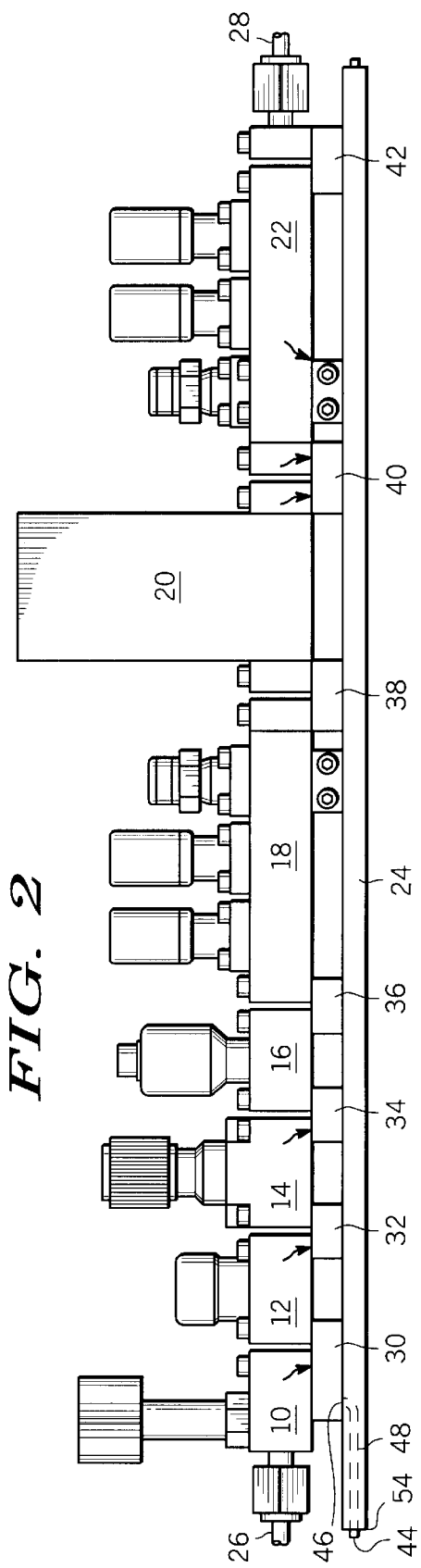
FIG. 2 shows an embodiment of the apparatus in accordance with the present invention, wherein the apparatus is formed by the gas stick of FIG. 1 (shown in a side view) mounted on a base plate in accordance with the present invention.

FIG. 1 shows a top view of a gas stick formed by a plurality of fluidic elements, and FIG. 2 shows an embodiment of the apparatus in accordance with the present invention, wherein the apparatus is formed by the gas stick of FIG. 1 (shown in a side view) mounted on a base plate in accordance with the present invention. In FIG. 1 and FIG. 2 potential leaks are denoted by a plurality of arrows. The gas stick shown in FIG. 1 and FIG. 2 comprises the following fluidic elements: a hand valve 10, a filter 12, a regulator 14, a transducer 16, an air operated valve 18 comprising a check valve, a mass flow controller 20, an air operated valve 22 comprising a check valve, an outlet 28 (the inlet 26 is integrally formed with the hand valve 10), and a plurality of base blocks 30 through 42. The base blocks 30 through 42 preferably comprise V-shaped channels or pipes enabling a fluid flow from one fluidic element mounted on a respective base block to an adjacent fluidic element mounted on the same base block. The base blocks 30 through 42 are mounted to a base plate 24. In this base plate 24 there is formed a plurality of pipes for feeding a suitable leak test agent to potential leaks. From this plurality of pipes only one pipe 48 is shown in FIG. 2. This pipe 48 comprises an outlet 46 for feeding an leak test agent to the connection area of the hand valve 10, base block 30 and the filter 12. The pipe 48 further comprises an inlet 44 located at the border 54 of the base plate 24. It is also generally possible to provide a single pipe with a plurality of outlets for feeding the leak test agent to a plurality of potential leaks. However, it is preferred to provide a separate pipe comprising only one outlet for every potential leak to ease localization of a leak. An alternative to the latter is to provide a single pipe with a plurality of outlets that are individually closeable for example by valves. In any case, with preferred embodiments of the present invention, it is possible to identify single components and/or connection areas of such components that are leaking. This allows effective cost control, for example by replacing single components rather than a whole gas panel. Furthermore, time is saved by specifically identifying problem areas quickly, for example to allow a tool to return to a production status.

Figure 3:
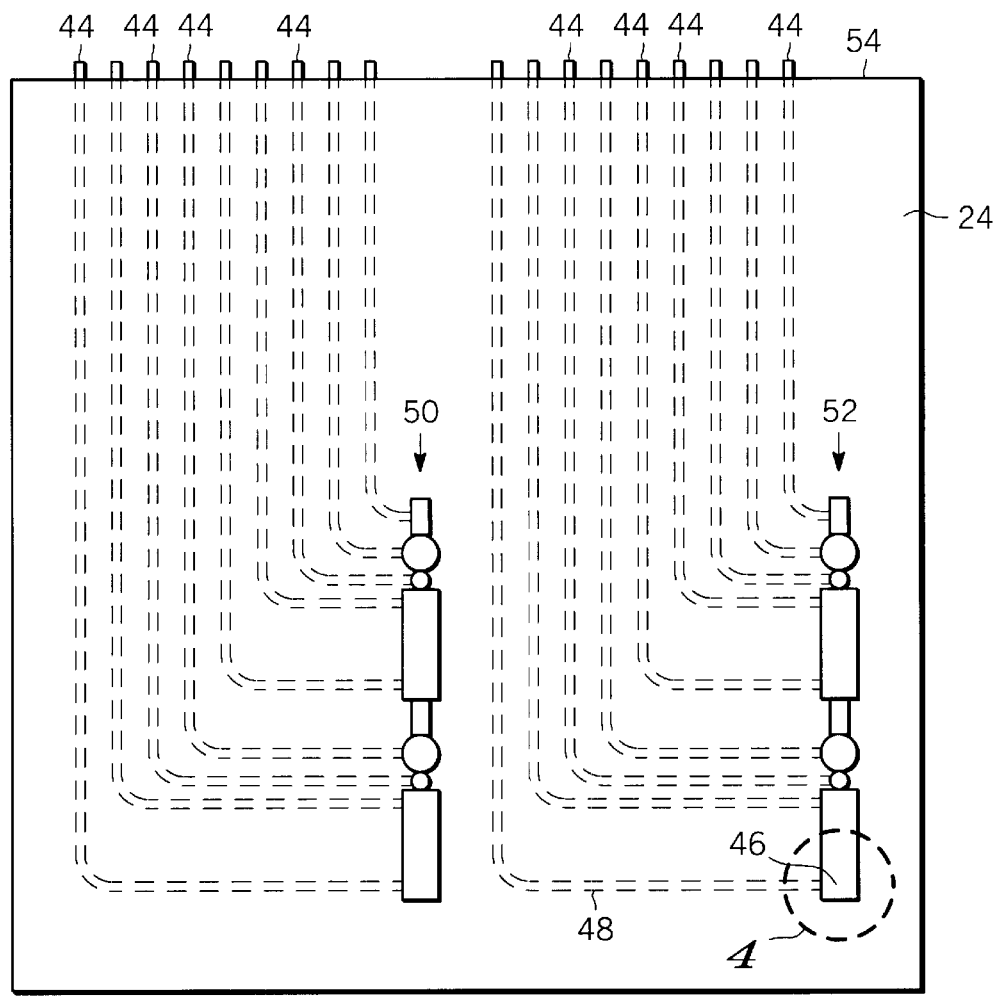
FIG. 3 shows an embodiment of a base plate in accordance with the present invention.
Figure 4:
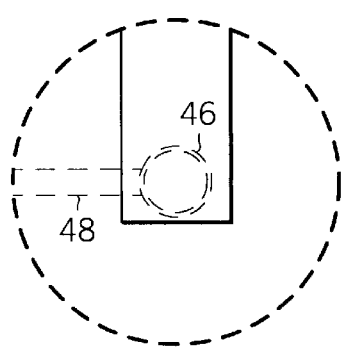
FIG. 4 is a detail view of the area I of FIG. 3.

FIG. 3 shows an embodiment of a base plate in accordance with the present invention and FIG. 4 is a detail view of the area 4 of FIG. 3. In accordance with the embodiment of FIG. 3 and FIG. 4 there are mounted to lines 50, 52 of a plurality of fluidic elements on the base plate 24. Each dashed line denotes a pipe formed in the base plate 24. Especially if the base plate 24 comprises a laminate structure the pipes may be formed integrally with the base plate 24. Of course it is also possible to provide separate pipes in or on the base plate 24. Each pipe comprises an inlet 44 at the border 54 of the base plate 24. For the sake of the clarity of the depiction only the pipe 48 is provided with a numeral. As may be seen from the detail view of FIG. 4 the pipe 48 comprises an outlet 46 of circular shape. The outlet 46 (and also the outlets of the other pipes) is located close to a potential leak, especially close to the connection area of two fluidic elements. The invention is particularly useful if two or more lines 50, 52 of fluidic elements are arranged close to each other since in this case it is very difficult to feed an leak test agent from the top to potential leaks.

While the invention has been described in terms of particular structures and devices, those of skill in the art will understand based on the description here in that it is not limited merrily to such examples and that the full scope of the invention is properly determined by the claims that follow.

What is claimed is:

1. An apparatus for conveying at least one fluid, comprising at least a first fluidic element and a second fluidic element connected to each other for conveying said fluid, and a base plate to which said first fluidic element and said second fluidic element are mounted, characterized in that said base plate comprises at least a first outlet for feeding a leak test agent to the connection area of said first fluidic element and said second fluidic element.

2. The apparatus according to claim 1, wherein said leak test agent comprises helium.

3. The apparatus according to claim 1, wherein said apparatus is a gas panel.

4. The apparatus according to claim 1, wherein said outlet is the outlet of a pipe provided in said base plate.

5. The apparatus according to claim 1, wherein said base plate comprises at least partly a laminate structure.

6. The apparatus according to claim 1, wherein a plurality of fluidic elements is arranged in lines, and wherein said lines are arranged adjacent to each other.

7. The apparatus according to claim 1, wherein at least one fluidic element is a valve.

8. The apparatus according to claim 1, wherein at least one fluidic element is a filter.

9. The apparatus according to claim 1, wherein at least one fluidic element is a pressure regulator.

10. The apparatus according to claim 1, wherein at least one fluidic element is a pressure transducer.

11. The apparatus according to claim 1, wherein at least one fluidic element is a mass flow controller.

12. The apparatus according to claim 1, wherein said base plate comprises a plurality of pipes each of which having an outlet for feeding said leak test agent to a connection area between adjacent fluidic elements, wherein each of said pipes comprises an inlet, and wherein said inlets are arranged at a border of said base plate.

13. A base plate for mounting at least a first fluidic element and a second fluidic element connectable to each other for conveying a fluid, characterized in that said base plate comprises at least a first outlet for feeding a leak test agent to an connection area of said first fluidic element and said second fluidic element.

14. The base plate according to claim 13, wherein said leak test agent comprises helium.

15. The base plate according to claim 13, wherein said outlet is the outlet of a pipe provided in said base plate.

16. The base plate according to claim 13, wherein said base plate comprises at least partly a laminate structure.

17. The base plate according to claim 13, wherein said base plate comprises a plurality of pipes each of which having an outlet for feeding said leak test agent to a connection area between adjacent fluidic elements, wherein each of said pipes comprises an inlet, and wherein said inlets are arranged at a border of said base plate.

* * * * *